(12) United States Patent
Birkeland et al.

(10) Patent No.: US 6,714,709 B1
(45) Date of Patent: Mar. 30, 2004

(54) OPTICAL SUBMARINE CABLE

(75) Inventors: Tom Harald Birkeland, Auli (NO);
Tom Eirik Toften, Fauske (NO); Inge Vintermyr, Oslo (NO)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/959,828

(22) PCT Filed: May 15, 2000

(86) PCT No.: PCT/EP00/04596
§ 371 (c)(1),
(2), (4) Date: Nov. 8, 2001

(87) PCT Pub. No.: WO00/72071
PCT Pub. Date: Nov. 30, 2000

(30) Foreign Application Priority Data

May 19, 1999 (NO) ................................................ 992393

(51) Int. Cl.⁷ ................................................. G02B 6/44
(52) U.S. Cl. ........................................ 385/111; 385/113
(58) Field of Search ................................. 385/111, 113, 385/107

(56) References Cited

U.S. PATENT DOCUMENTS

| 4,676,590 A | | 6/1987 | Priaroggia | |
|---|---|---|---|---|
| 4,696,542 A | * | 9/1987 | Thompson | 385/108 |
| 5,325,457 A | * | 6/1994 | Bottoms et al. | 385/113 |
| 5,896,482 A | * | 4/1999 | Blee et al. | 385/107 |
| 5,905,834 A | * | 5/1999 | Anderson et al. | 385/111 |
| 6,052,502 A | * | 4/2000 | Coleman | 385/114 |
| 6,208,785 B1 | * | 3/2001 | Ishikawa et al. | 385/111 |

FOREIGN PATENT DOCUMENTS

| CH | 688 252 A5 | 6/1997 |
| DE | 41 35 634 C1 | 10/1991 |
| EP | 0 203 538 A2 | 12/1986 |
| EP | 0 321 262 B1 | 6/1989 |
| EP | 0 710 862 A1 | 5/1996 |
| GB | 2 240 638 A | 8/1991 |
| WO | WO 98/06109 | 2/1998 |

OTHER PUBLICATIONS

Patent Abstracts of Japan, vol. 1995, No. 11, Dec. 26, 1995 corresponding to JP 07229795 dated Aug. 29, 1995.
International Preliminary Examination Report for International application No. PCT/EP00/04596, three (3) pages concerning Section V and Section VII.

* cited by examiner

*Primary Examiner*—Ellen E. Kim
(74) *Attorney, Agent, or Firm*—Sughrue Mion, PLLC

(57) ABSTRACT

An optical submarine cable with a sheath 8 and a core is proposed. It comprises optical fibers 1 which are enclosed in a metal tube 3. The tube is disposed near the axis of the cable. The cable comprises at least two metal tubes 3 and the tubes are SZ-stranded.

17 Claims, 2 Drawing Sheets

OPTICAL SUBMARINE CABLE

BACKGROUND AND SUMMARY

The present invention relates to an optical submarine cable with a sheath and a core, which comprises optical fibres, wherein the fibres are enclosed in a metal tube which is disposed near the axis of the cable.

Optical cables have a core with optical fibres, in most cases glass fibres coated with one or more layers of polymer material for protection and identification. The cable core is enclosed in a sheath made from a polymer material, e. g. a polyolefine. For submarine cables, a common design comprises a central loose tube around the fibres. The tube is formed from a metal band and hermetically sealed by welding of the band edges. It is disposed on the axis of the cable and consists of steel to ensure a high protection of the fibres, especially from the hydrostatic pressure at the sea bed. Interstices in the core are generally filled with a hydrophobic jelly to avoid spreading of water in the lengthwise direction if the cable is damaged. In another common design of cables, a core element has slots wherein the fibres are disposed, often as fibre-ribbons comprising several fibres. A slotted core design has the advantage that a high number of fibres can be incorporated in the core.

Although steel tubes offer superior protection, tubes with a typical diameter of 3.7 mm can accommodate only up to approximately 45 to 50 fibres before the optical properties of the fibres deteriorate and the optical damping increases. If the diameter of the tube is increased while keeping a constant thickness of the wall, the mechanical stability gets worse. Therefore, the possible range of tube diameters for high pressure environments, e. g. for deep sea applications, is limited. Furthermore, it is difficult to distinguish a high number of loose fibres inside a tube, especially in view of the small fibre diameter. The use of tubes with different dimensions depending on the cable type can be disadvantageous because of the necessary time for change-over of the machinery and different welding parameters for the tubes.

It is therefore an object of the present invention to obviate these disadvantages and to develop a cable with a high-number of optical fibres protected by a metal tube. It is a further object, to provide a cable with a good flexibility and a low diameter. It is still another object of the invention to develop a cable wherein the properties of the metal tube can be independent of the number of fibres inside the cable.

According to the invention the cable comprises at least two metal tubes and the tubes are SZ-stranded.

A central idea of the invention is to incorporate more than one metal tube into the core of the cable. Because not more than one tube can be located on the axis of a cable, the tubes have to be stranded to avoid damage when the cable is bent. The core can comprise for example 2, 3, 4 or more tubes made from a high strength metal and stranded with each other. Alternatively or in addition, one or several layers of tubes can be stranded around a central tube, a central group of tubes or another central element. A central tube can also contain optical fibres.

The number of tubes is chosen according to the required number of optical fibres. As a result, the dimensions of the tubes can be chosen according to the necessary mechanical properties. The dimensions of the tubes are preferably, although not necessarily, identical so that all tubes can be manufactured with the same machinery without changes in the manufacturing parameters. The number of fibres in each tube should be limited to approximately 50 or below for a tube with a diameter of 3.7 mm to avoid a deterioration of the optical properties. The fibres are accommodated in the tubes with a defined excess length to avoid mechanical stresses due to temperature variations or forces on the cable. The outer dimensions of the cable vary only insignificantly with the number of tubes inside. The tubes offer the opportunity to accommodate a high number of safely protected fibres in a small volume. The accommodation of the fibres in more than one tube allows for an easy identification of the fibres and a small diameter of the tubes.

As submarine cables are manufactured with great length, SZ-stranding is necessary which allows an unlimited length of the stranded tubes. With a single sense of stranding, the length is limited by the size of the reels for the metal tubes which can be accommodated in the stranding machine. Suitable is an SZ-stranding with approximately five to seven lays before the sense of rotation is reversed. Depending on the properties and arrangement of the tubes in the core and of the required properties of the cable other numbers of lays are possible. The core is preferably provided with an outer wrapping for stabilisation of the stranded assembly, e.g. a polyester tape. Over the wrapping, a sheath is extruded which consists for example of polyethylene.

In a preferred embodiment, of the invention, the metal tube is a welded steel tube which is mechanically robust and offers a safe protection of the fibres.

Interstices in the core of the cable are preferably filled with a hydrophobic compound which avoids the spread of water inside the cable. The hydrophobic compound can also be applied on the outside surface of the wrapping to avoid spread of water between wrapping and sheath.

To ensure a round cross section of the cable with a well-defined diameter and to improve the stability, the core comprises filler elements. They are disposed in grooves and interstices between the tubes to result in an approximately round cross section of the core. Filler elements can also replace one or more tubes in the core. In this case, the diameter of the filler element is identical to the diameter of the tube which it replaces. A suitable material for the filler elements is polyethylene which has a limited flexibility and sufficiently low compressibility to withstand hydrostatic pressure.

In an advantageous embodiment of the invention, at least one filler element is optically distinguishable from another filler element. Preferably, one or several filler elements with different colours or markings are used. The filler elements are disposed in a defined relationship to the tubes and allow therefore an identification of the individual tubes.

Because steel tubes have a comparatively high specific electrical resistance, the core of a preferred cable comprises at least one bare conductor with a low electrical resistance like a copper tape or a copper wire. If the sheath of the cable is damaged, a current can be fed through the conductor for detection with a probe which is moved along the cable to locate the damaged section. It is possible that a copper conductor is a filler element.

Especially in shallow water with a depth up to several 100 meters, a cable is often subject to impact forces which may for example be caused by fishing gears. To avoid damage, the cable is preferably provided with an armouring which can consist of one or several layers of steel wires stranded around the sheath. The number of wires depends on the required protection, the acceptable weight and diameter of the cable. Optionally, a bedding layer consisting for example of impregnated paper is disposed between the sheath and the armouring. If the sheath has a sufficient thickness, a bedding can be omitted. To avoid corrosion, steel wires are galvanised with zinc and their interstices and their surfaces are covered with bitumen in a preferred cable.

For the protection of the armouring, an advantageous cable comprises an outer jacket. The jacket can consist of one or several layers of polymer yarn, especially polypropylene yarn, wherein at least the innermost layer adjacent to the armouring is flooded with a watertight material such as bitumen. Alternatively, the jacket is a compact sheath consisting of a polymer material like polypropylene, polyurethane or polyethylene.

The foregoing and other objects, features and advantages of the present invention will become more apparent in the following detailed description of preferred embodiments as illustrated in the accompanying drawings.

DETAILED DESCRIPTION OF THE INVENTION

Figure 1:
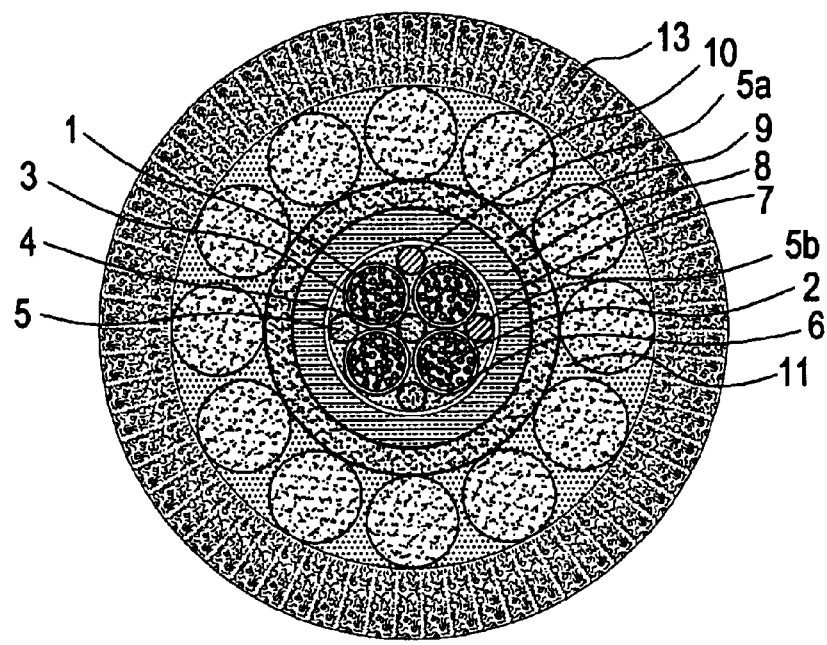
FIG. 1 shows the cross section of a cable according to the invention.
Figure 2:
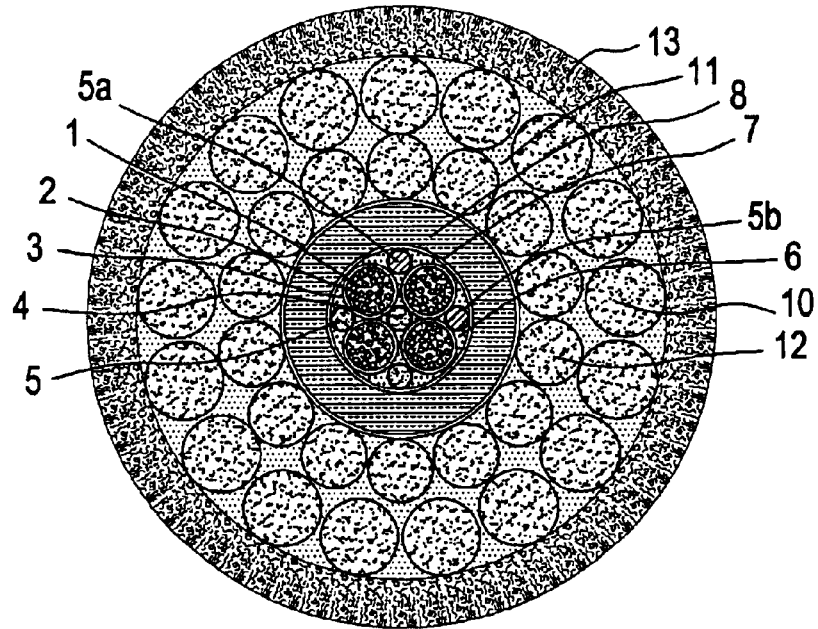
FIG. 2 shows the cross section of an alternative embodiment.

The cables illustrated in FIGS. 1 and 2 have cores with the same elements and differ only in the design of the sheath and armouring.

The core of the cable in FIG. 1 comprises 192 glass fibres 1, for example single or multimode fibres which have outer coatings with at least one, generally two or three layers of polymer material and a total diameter of 0.25 mm. The fibres 1 are disposed in welded steel tubes 3 which are filled with a water blocking compound 2, i. e. a hydrophobic material. The fibres 1 inside a tube 3 can be distinguished by different colouring of their polymer coatings and different markings. Each of the four tubes 3 in the example described has an outer diameter around 3.7 mm and a wall thickness in the range of 0.2 mm and contains several fibres 1. In this case, approximately 48 fibres 1 can be accommodated in a single tube 3 while the optical damping increases for a larger number. For a cable with a total number of fibres 1 between 49 and 144, one or more of the four tubes 3 can be replaced by filler elements.

Suitable diameters of the tubes 3 are in the range of 1–8 mm. For example, a larger outer diameter of 5.6 mm allows for the accommodation of 96 fibres in a single tube 3 without increased optical damping. If the tubes 3 are arranged as in FIG. 1 this corresponds to a core with a total number of 384 fibres 1, i.e. with a 50% increase in the outer diameter of the core the number of fibres can be doubled. The allowable diameter of the tubes 3 depends mainly on the forces in the environment of the cable.

The tubes 3 are stranded around a central filler element 4 on the axis of the cable. The stranding avoids damage of the tubes 3 and fibres 1 if the cable is accommodated on a cable reel. The tubes 3 are SZ-stranded with for example five or six lays with a first sense of rotation before the sense of rotation is reversed. Additional filler elements 5 are disposed in the outer grooves between the steel tubes 3 to create an approximately round cross section of the core and stabilise the assembly. Two filler elements 5a, 5b in the grooves between the tubes 3 are coloured, e. g. red and blue, to be distinguishable. As they are located in fixed relation with respect to the tubes 3, this allows an unambiguous identification of the individual tubes 3. Alternatively or in addition, one or more filler elements 5a can be copper conductors which can also be distinguished from polyethylene filler elements 5b and allow to feed an electrical current through the cable. If the cable is damaged, the current can be detected with a current-sensitive probe which is moved through the sea in near vicinity along the cable to locate the damaged section.

The remaining interstices in the core are filled with a hydrophobic material 6 for water blocking. The outer surface of the core is provided with a wrapping 7, e. g. a polyester tape. A sheath 8 which consists preferably of polyethylene encloses the core. To avoid spreading of water between the wrapping 7 and the sheath 8, hydrophobic material 6 can also be disposed on the outer surface of the wrapping.

As is shown in FIGS. 1 and 2, the armouring of the cable can consist of one or two layers of galvanised steel wires 10, 12 with preferred diameters in the range of 3–6 mm depending on the required protection. To protect the sheath 8, a bedding layer 9 can be disposed between the sheath 8 and the wires 10 of the armouring. In many cases, a bedding layer 9 can be omitted, especially if the thickness of the sheath 8 is sufficiently high as in FIG. 2. A filling compound 11, e.g. bitumen, fills interstices in the armouring.

An outer jacket 13 which consists of layers of polypropylene yarn protects the armouring from damages. At least the innermost layer of the jacket 13 is flooded with the filling compound 11 to exclude that water gets in contact with the armouring wires 10, 12.

Figure 3:
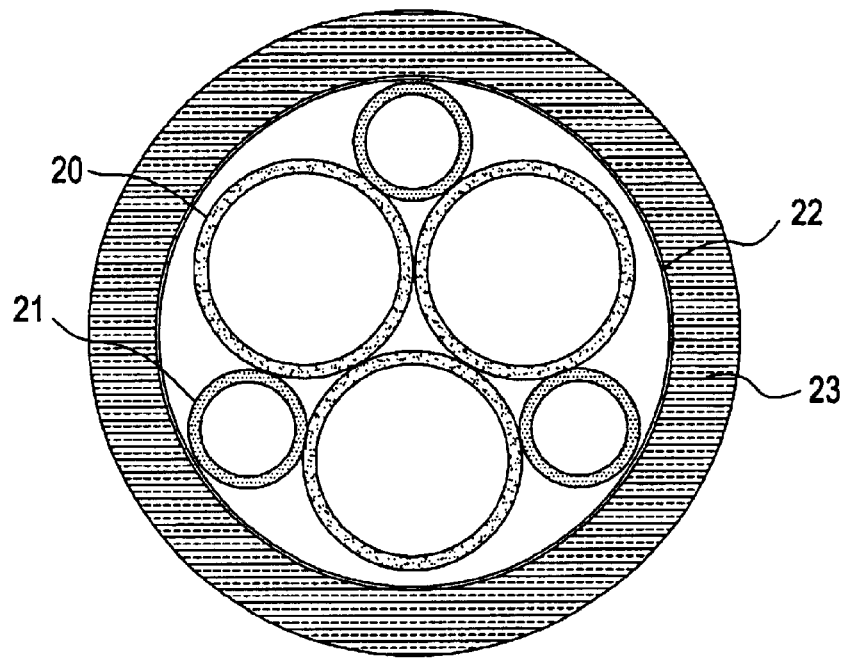
FIG. 3 shows the cross section of an alternative embodiment of a cable core.
Figure 4:
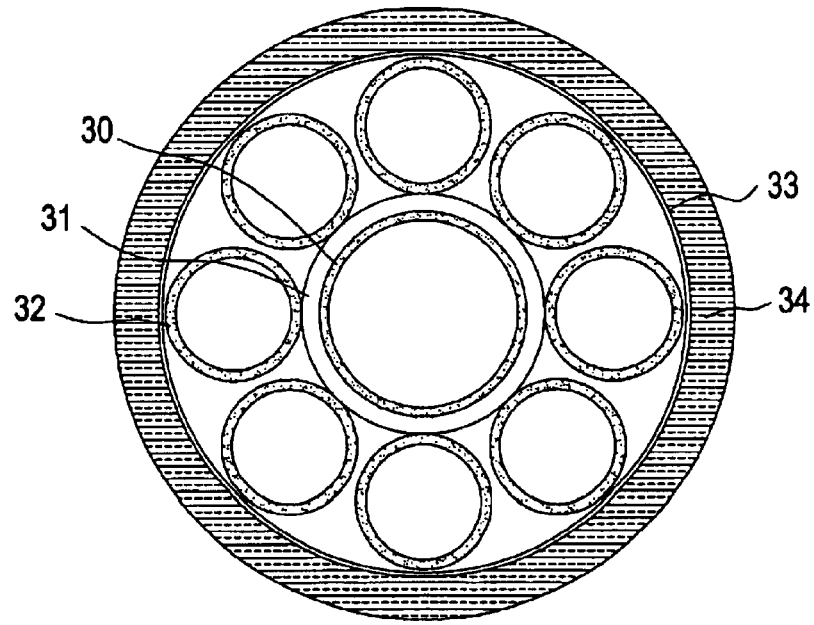
FIG. 4 shows the cross section of a second alternative embodiment of a cable core.

FIGS. 3 and 4 show cross sections of different cores for cables according to the invention. The cores can be provided with an armouring as described above. To simplify the drawings, only the arrangement of the tubes inside the core is shown. However, the cores also comprise optical fibres, water blocking material inside and between the tubes and optionally electrical conductors and/or filler elements as described above.

In FIG. 3, metal tubes 20, 21 with different sizes are used. In this way, a nearly round cross section of the core is attained without fillers. Three larger tubes 20 with an outer diameter of for example 5.6 mm can contain 96 fibres each while the smaller tubes 21 with an outer diameter of 3.0 mm are suitable for the accommodation of 36 fibres each.

In this way, the core comprises 396 fibres while the total diameter is comparatively small. The core is provided with a wrapping 22 and a sheath 23.

In FIG. 4, the central element of the cable is a tube 30 with an outer diameter of e. g. 5.6 mm which can contain up to 96 fibres. The tube 30 is provided with an outer layer 31 of an extruded polymer like polyethylene or a tape wound around the tube 30. Eight tubes 32 with a diameter of 3.7 mm are SZ-stranded around the central tube 30. With 48 fibres in each outer tube 32 the core contains a total of 480 fibres. A wrapping 33 and a sheath 34 enclose the core.

The above embodiments admirably achieve the objects of the invention. However, it will be appreciated that departures can be made by those skilled in the art without departing from the scope of the invention which is limited only by the claims.

What is claimed is:

1. An optical submarine cable with a sheath and a core which comprises optical fibers enclosed in tubes disposed near the axis of the cable and SZ-stranded, characterized in that said tubes are welded steel tubes filled with a water blocking compound, filler elements are disposed between said steel tubes to create an approximately round cross section of said core, said sheath encloses said core, the interstices in the core being filled with hydrophobic material, at least one armoring layer of galvanized steel wires protects said sheath, and said armouring layer is enclosed in an outer jacket (13).

2. An optical submarine cable according to claim 1, wherein said filler elements include a central filler element, and wherein said welded steel tubes are SZ stranded around the central filler element and form at least one layer.

3. An optical submarine cable according to claim 1, characterized in that at least one of said filler element is optically distinguishable from a second filler element.

4. Optical submarine cable according to claim 1, characterized in that said core comprises a conductor with low electrical resistance.

5. The cable of claim 1, wherein adjacent stranded metal tubes are in direct contact.

6. The cable of claim 1, wherein the filler elements have a diameter smaller than respective diameters of the metal tubes.

7. The cable of claim 1, wherein the filler elements are disposed in grooves formed by steel tubes that are directly adjacent each other.

8. The cable of claim 1, wherein the core is void of separate metal reinforcing members.

9. An optical submarine cable with a sheath and a core which comprises optical fibers enclosed in tubes disposed near an axis of the cable and SZ stranded, characterized in that:

said tubes are welded steel tubes filled with a water blocking compound, some welded steel tubes are disposed between the other welded steel tubes to create an approximately round cross section of said core, said sheath encloses said core, the interstices in the core being filled with hydrophobic material, at least one armoring layer of galvanized steel wires protects said sheath, and said armouring layer is enclosed in an outer jacket.

10. The cable of claim 9, wherein at least two of the steel tubes have different diameters.

11. An optical submarine cable with a sheath and a core which comprises optical fibers enclosed in tubes disposed near an axis of the cable and SZ stranded, characterized in that:

said tubes are welded steel tubes, and SZ stranded around a central welded steel tube, said tubes being filled with a water blocking compound and forming a core with an approximately round cross section, said sheath encloses said core, the interstices in the core being filled with hydrophobic material, at least one armoring layer of galvanized steel wires protects said sheath, and said armoring layer is enclosed in an outer jacket.

12. The cable of claim 11, wherein the central welded steel tube has a larger diameter than the tubes stranded around the central welded steel tube.

13. An optical submarine cable with a sheath and a core which comprises optical fibers enclosed in tubes disposed near the axis of the cable and SZ-stranded, characterized in that the tubes are welded metal tubes filled with water blocking compound, filler elements are disposed between the metal tubes to create an approximately round cross section of the core, the sheath encloses the core, the interstices in the core being filled with hydrophobic material, at least one armoring layer of galvanized steel wires protects the sheath, and the armouring layer is enclosed in an outer jacket.

14. The cable of claim 13, wherein adjacent stranded metal tubes are in direct contact.

15. The cable of claim 13, wherein the number of fibers enclosed in each metal tube is approximately 48.

16. The cable of claim 13, wherein the total number of fibers is greater than 49.

17. The cable of claim 13, wherein the total number of fibers is between 49 and 384.

* * * * *